United States Patent [19]
Sugita

[11] Patent Number: 6,059,412
[45] Date of Patent: May 9, 2000

[54] REAR PROJECTION MONITOR

[75] Inventor: Yasutoshi Sugita, Tokorozawa, Japan

[73] Assignee: Canon Kabushiki Kaisha, Tokyo, Japan

[21] Appl. No.: 09/080,396

[22] Filed: May 18, 1998

[30] Foreign Application Priority Data

May 21, 1997 [JP] Japan .................................. 9-146060

[51] Int. Cl.[7] .................................................. G03B 21/28
[52] U.S. Cl. .............................. 353/37; 353/78; 353/99
[58] Field of Search .............................. 353/37, 77, 78, 353/99; 352/104

[56] References Cited

U.S. PATENT DOCUMENTS

| | | |
|---|---|---|
| 3,472,588 | 10/1969 | Dine et al. .................................. 353/99 |
| 3,885,868 | 5/1975 | Hadzimihalis ............................. 353/71 |
| 4,938,586 | 7/1990 | Hirose et al. .......................... 353/26 A |
| 5,755,500 | 5/1998 | Matsumoto et al. ...................... 353/78 |

*Primary Examiner*—Alan A. Mathews
*Attorney, Agent, or Firm*—Fitzpatrick, Cella, Harper & Scinto

[57] ABSTRACT

A rear projection monitor includes a projection optical system, a screen, and a guide optical system. The projection optical system projects an original image. The original image is projected on the screen from the rear side to display an enlarged image of the original image. The guide optical system guides light emitted from the projection optical system to the screen. The guide optical system has a movable reflecting surface, and functions to adjust the position of the image on the screen by changing the incident angle of light emitted from the projection optical system to the reflecting surface.

6 Claims, 7 Drawing Sheets

REAR PROJECTION MONITOR

BACKGROUND OF THE INVENTION

1. Field of the Invention

The present invention relates to a rear projection monitor for enlarging and projecting a display image on a liquid crystal display element, a CRT, or the like from the rear surface of a screen and, more particularly, to a mechanism for adjusting the image projection position on the screen.

2. Related Background Art

Figure 10:
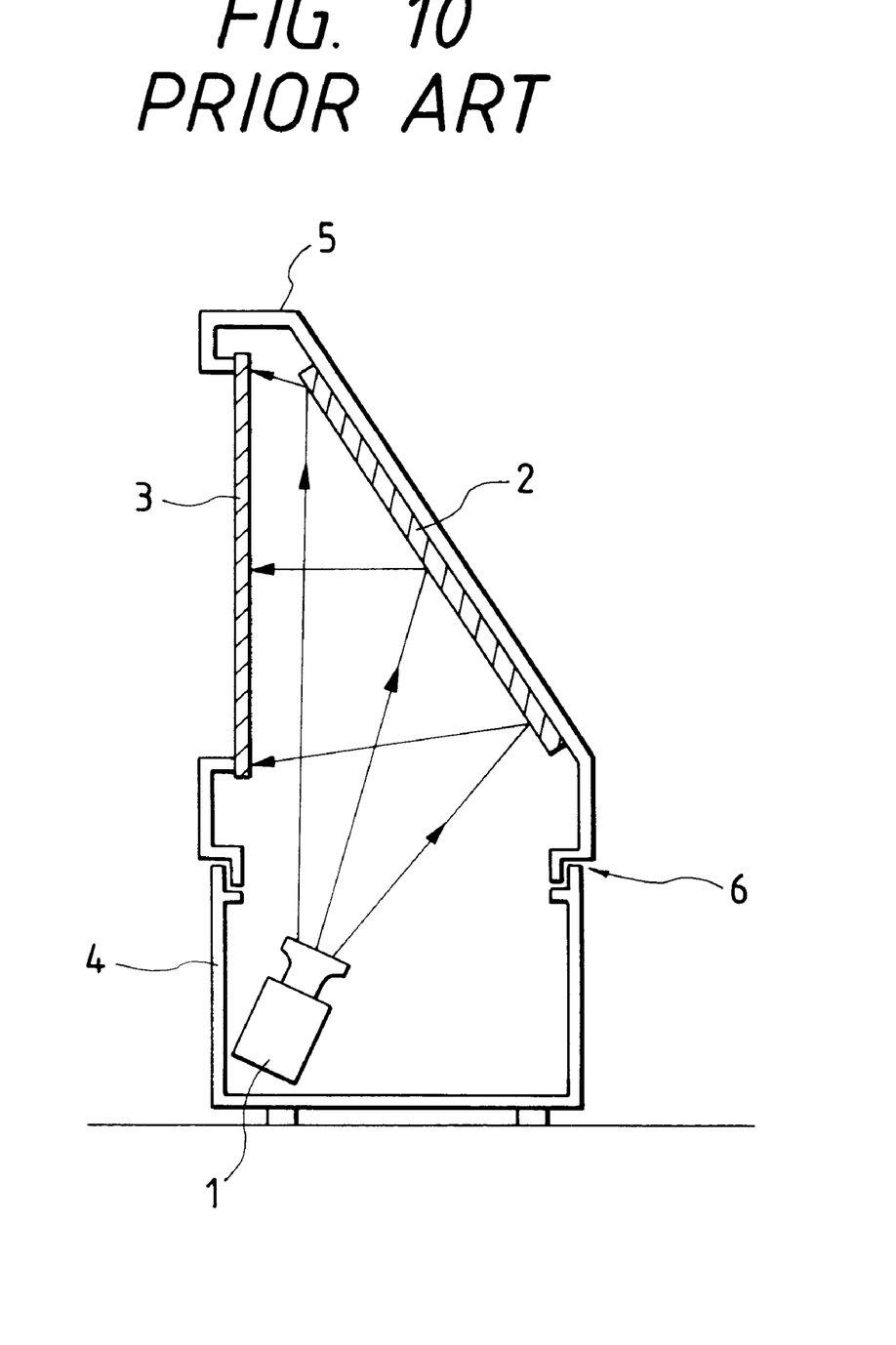
FIG. 10 is a sectional view schematically showing a conventional rear projection monitor.

FIG. 10 shows an example of a conventional rear projection monitor. More specifically, the rear projection monitor is constituted by coupling, at a fitting portion 6, a monitor 5 made up of a reflecting mirror 2 and a screen 3 to a lower case 4 in which a projector 1 incorporating red, green, and blue liquid crystal panels or CRTs to emit color beams via a projection lens, and a power supply unit and a driving unit (neither is shown) are stored. A projection image emitted via the projection lens of the projector 1 is projected on the screen 3 from its rear side to form a color image on its front surface.

In the conventional rear projection monitor, the monitor 5 and the lower case 4 are made up of different components. For this reason, the projection image may not be projected on a correct position on the screen 3 due to the precision of the fitting portion 6 and the component precisions of the monitor 5 and the lower case 4.

SUMMARY OF THE INVENTION

The present invention has been made to overcome the conventional drawbacks, and has as its object to provide a rear projection monitor on which the projection image position on a screen can be adjusted.

To achieve the above object, a rear projection monitor according to the present invention has the following arrangement.

The rear projection monitor comprises a projection optical system for projecting an original image, a screen on which the original image is projected from a rear side to display an enlarged image of the original image, and a guide optical system for guiding light emitted from the projection optical system to the screen, the guide optical system having a movable reflecting surface, and functioning to adjust a position of the image on the screen by changing an incident angle of light emitted from the projection optical system to the reflecting surface.

DETAILED DESCRIPTION OF THE PREFERRED EMBODIMENTS

The first embodiment of the present invention will be described below with reference to FIGS. 1 to 6.

Figure 1:
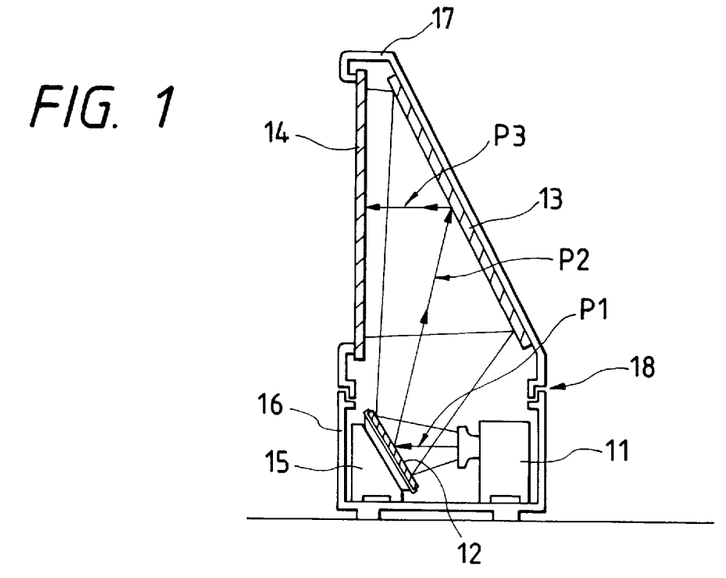
FIG. 1 is a sectional view schematically showing a rear projection monitor according to the first embodiment of the first embodiment.
Figure 2:
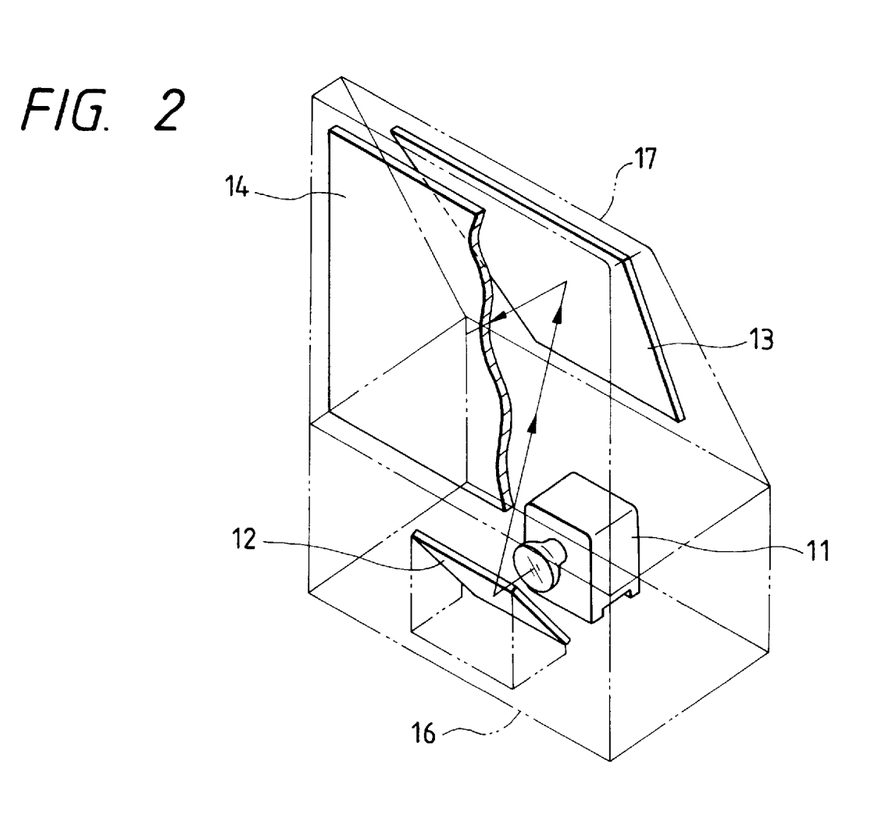
FIG. 2 is a perspective view showing the arrangement of the rear projection monitor.
Figure 3:
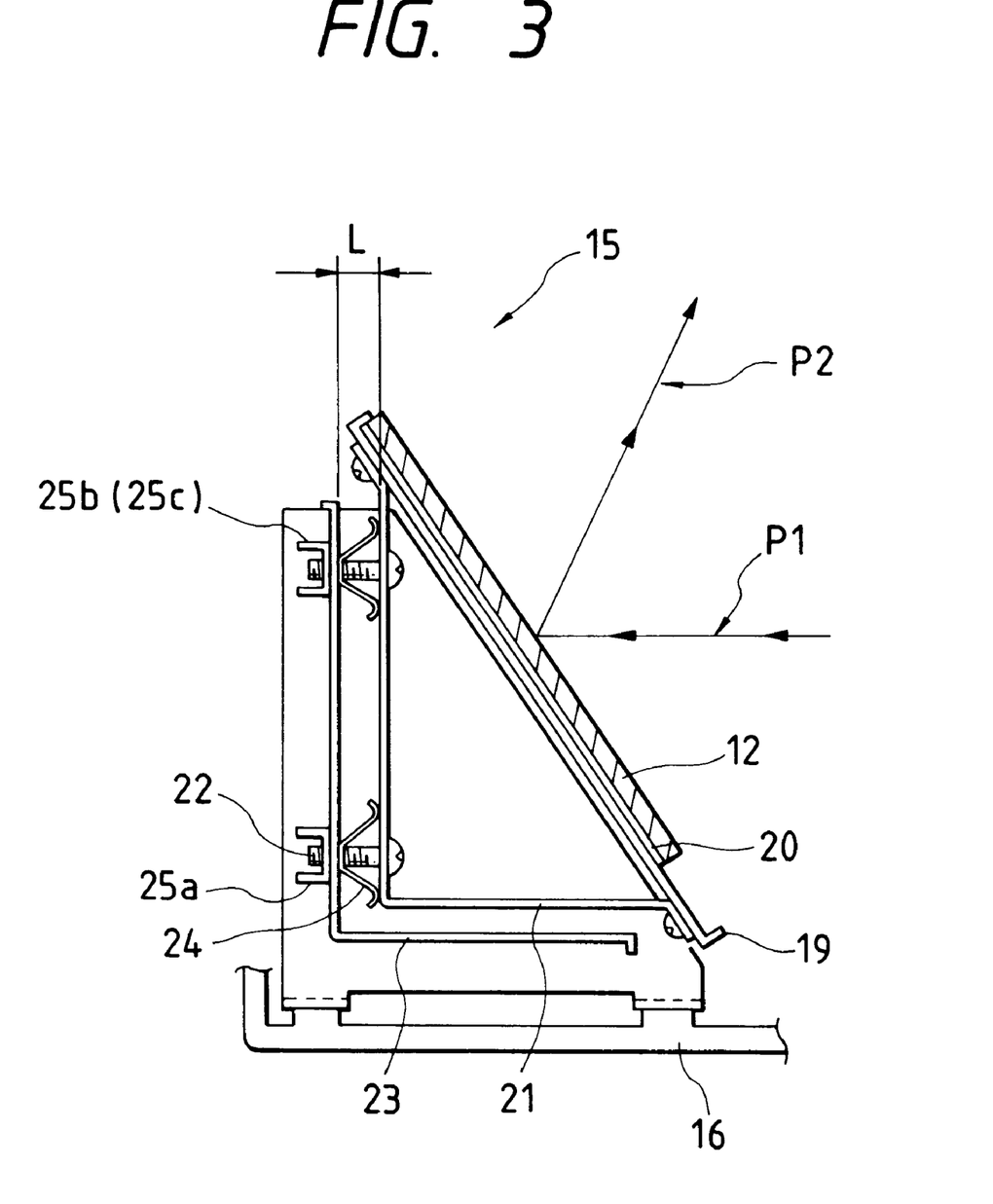
FIG. 3 is a sectional view of a first reflecting mirror unit.
Figure 4:
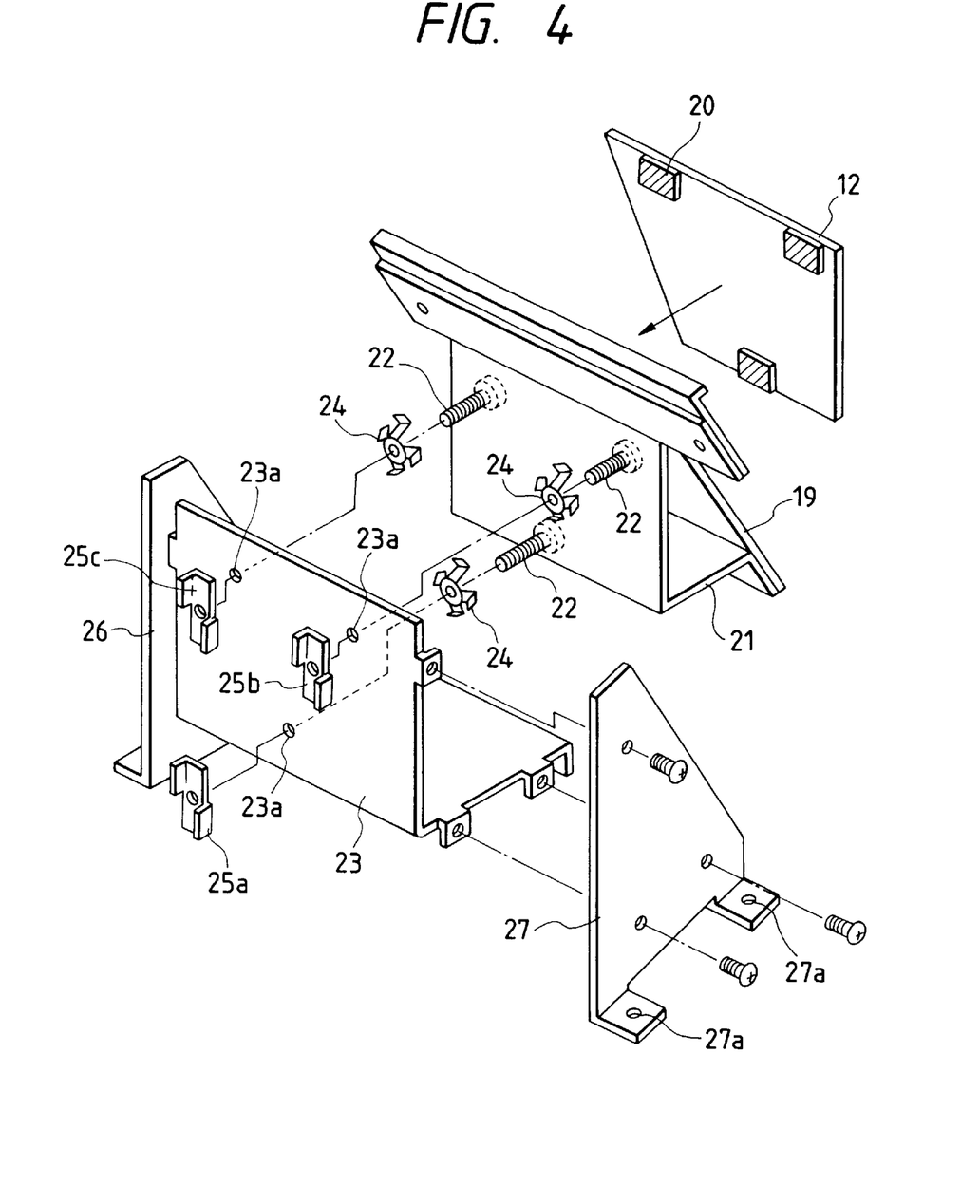
FIG. 4 is an exploded perspective view of the first reflecting mirror unit.
Figure 5:
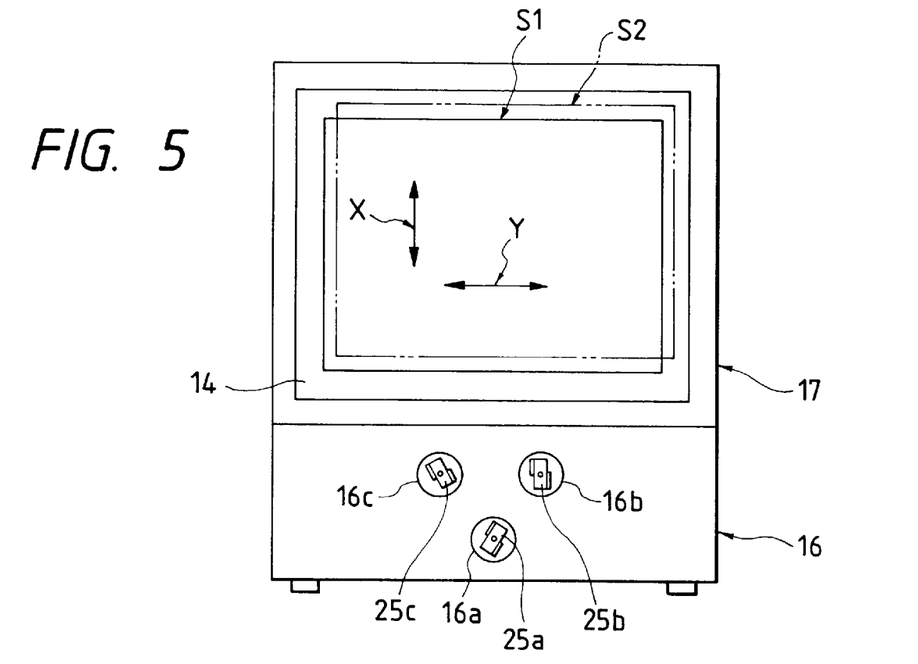
FIG. 5 is a front view showing the positional relationship of an image projected on a screen.
Figure 6:
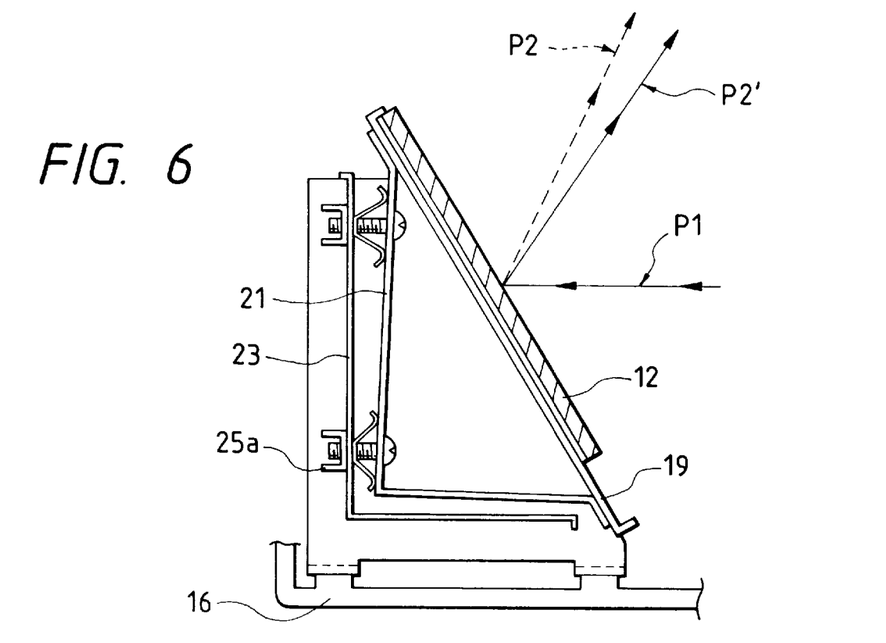
FIG. 6 is a sectional view showing the state of the first reflecting mirror unit upon adjustment.

FIG. 1 is a sectional view of a rear projection monitor according to the first embodiment. FIG. 2 is a perspective view showing the layout of constituent components. FIG. 3 is a sectional view of a reflecting mirror unit having a swing and tilt (or shift and rise-fall) adjusting mechanism. FIG. 4 is an exploded perspective view of the reflecting mirror unit. FIG. 5 is a front view of the rear projection monitor. FIG. 6 is a sectional view for explaining the state of thereflecting mirror unit upon adjustment.

Referring to FIGS. 1 to 6, a projector 11 incorporates red, green, and blue liquid crystal panels or CRTs and emits color beams via a projection lens. A first reflecting mirror 12 is located in front of the projector 11 and arranged on a mirror unit 15 (to be described later). A screen 14 is arranged in front of a second reflecting mirror 13. A projection image emitted via the projection lens of the projector 11 is projected on the screen 14 from its rear side via the first and second reflecting mirrors 12 and 13.

The first reflecting mirror unit 15 holds the first reflecting mirror 12 and comprises a swing and tilt adjusting mechanism for adjusting the position of the first reflecting mirror 12. The projector 11, the first reflecting mirror unit 15, a power supply unit, and a driving circuit (latter two are not shown) are stored in a lower case 16. A monitor 17 holds the second reflecting mirror 13 and the screen 14 on the rear and front sides, respectively. A fitting portion 18 at the bottom of the monitor 17 is fitted in the upper edge of the lower case 16.

The swing and tilt adjusting mechanism of the first mirror unit 15 for holding the first reflecting mirror 12 will be explained with reference to FIGS. 3 to 5.

The first reflecting mirror 12 is fixed to a mirror attaching plate 19 by a double-coated tape 20 at three portions. Three vises 22 extend through a mirror support plate 21 and project to the front side. The mirror attaching plate 19 is screwed and fixed to the mirror support plate 21 at a predetermined angle. An L-shaped front plate 23 has three through holes 23a for allowing the vises 22 to project therefrom. Adjusting leaf springs 24 through which the vises 22 respectively extend are interposed between the front plate 23 and the mirror support plate 21. An adjusting nut 25a and adjusting nuts 25b and 25c are respectively engaged at the distal ends of the lower center vis 22 and upper vises 22. With this structure, the mirror support plate 21 is held at the three portions.

Left and right side plates 26 and 27 are respectively fixed to the two end edges of the front plate 23, and screwed and fixed to the lower case 16 via attaching holes 26a(not shown) and attaching holes 27a.

While the first reflecting mirror unit 15 is mounted in the lower case 16, the adjusting nuts 25a, 25b, and 25c are positioned at opening portions 16a, 16b, and 16c formed in the front of the lower case 16 and can be adjusted from the outside. In the first embodiment, the opening portions 16a, 16b, and 16c are formed on the front side of the screen 14. This makes it possible to adjust the projection image position while a projected image on the screen 14 is confirmed.

The adjustment of the projection image position on the screen according to the first embodiment having the above arrangement will be described.

In FIG. 3, letting P1 be the optical path of a beam incident on the first reflecting mirror 12 via the projection lens of the projector 11, and P2 be the optical path of the beam reflected by the first reflecting mirror 12 toward the second reflecting mirror 13, a size L determined in advance so as to direct the optical path P2 to a correct position can be set by the pivotal movement of the three adjusting nuts 25a, 25b, and 25c and the operation of the adjusting leaf springs 24.

The first reflecting mirror unit 15 assembled in the above manner is fixed to the lower case 16, as shown in FIGS. 1 and 2. The monitor 17 is coupled to the upper portion of the lower case 16 via the fitting portion 18, as shown in FIG. 1. The beam reflected by the second reflecting mirror 13 does not always reach a predetermined position on the screen 14 due to the component precision of the lower case 16 and the monitor 17, and a projected image may shift vertically or horizontally. For example, in FIG. 5, although an image should be projected at a correct position S1 on the screen 14, it may be practically projected at a position S2.

To adjust the image positional shift upon assembly, in FIG. 5, the adjusting nut 25a is pivoted to move the image in the x direction, i.e., vertically, and the adjusting nuts 25b and 25c are pivoted to move the image in the y direction, i.e., horizontally.

FIG. 6 shows an example in which the adjusting nut 25a is pivoted to move and adjust the image projected on the screen 14 in the x direction (downward). By changing the incident angle of the beam incident on the first reflecting mirror 12, the axial direction of the reflected beam changes from P2 to P2'. Accordingly, a path P3 of the beam reflected by the second reflecting mirror 13 moves down in FIG. 1, and the projected image on the screen 14 moves down.

When the projection image position is adjusted by the swing and tilt adjusting mechanism of the reflecting mirror in the above-described way, the image projected on the screen 14 distorts to a trapezoidal shape. However, this does not pose any problem in practical use because the absolute amount of the distortion is sufficiently small in an optical system employed in the first embodiment.

Figure 7:
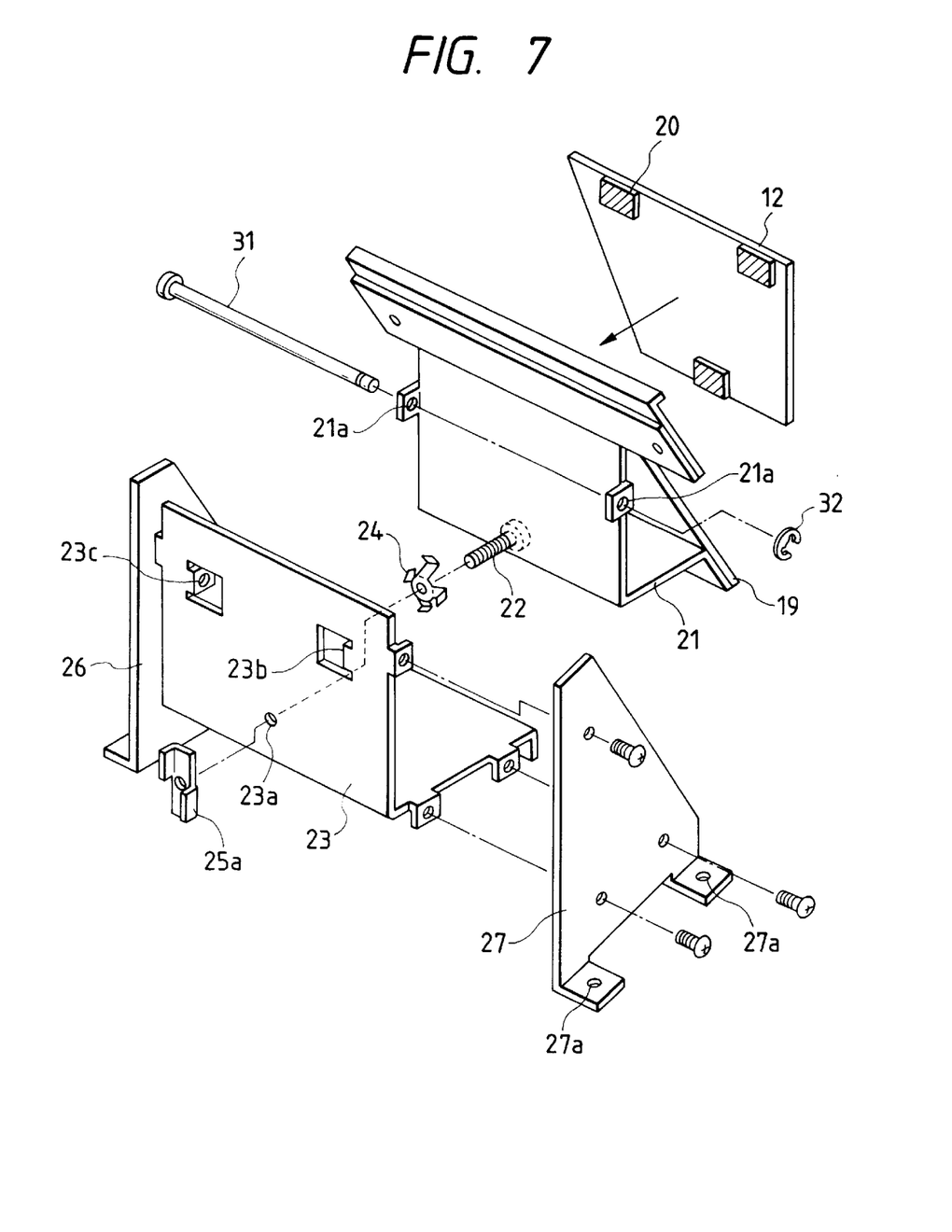
FIG. 7 is an exploded perspective view of the first reflecting mirror unit in a rear projection monitor according to the second embodiment of the first embodiment.
Figure 8:
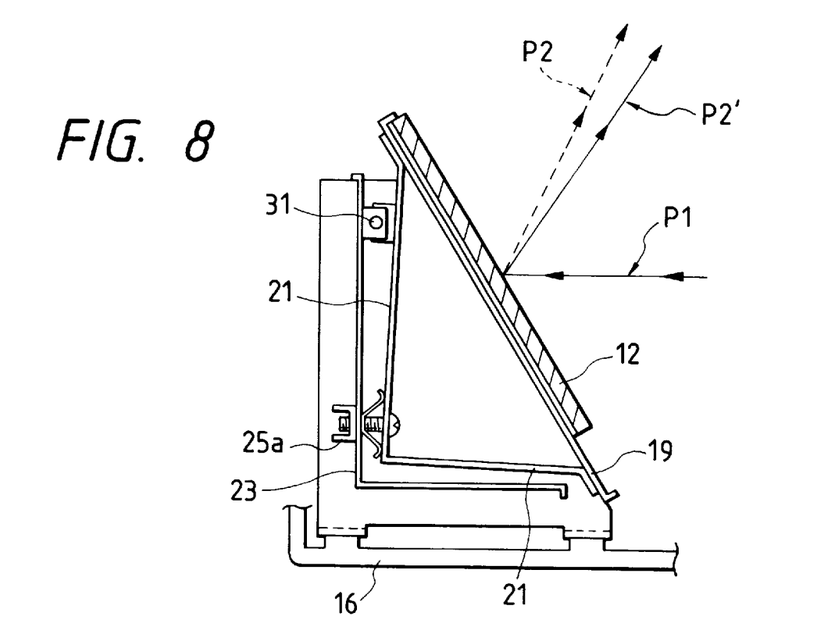
FIG. 8 is a sectional view showing the state of the first reflecting mirror unit.
Figure 9:
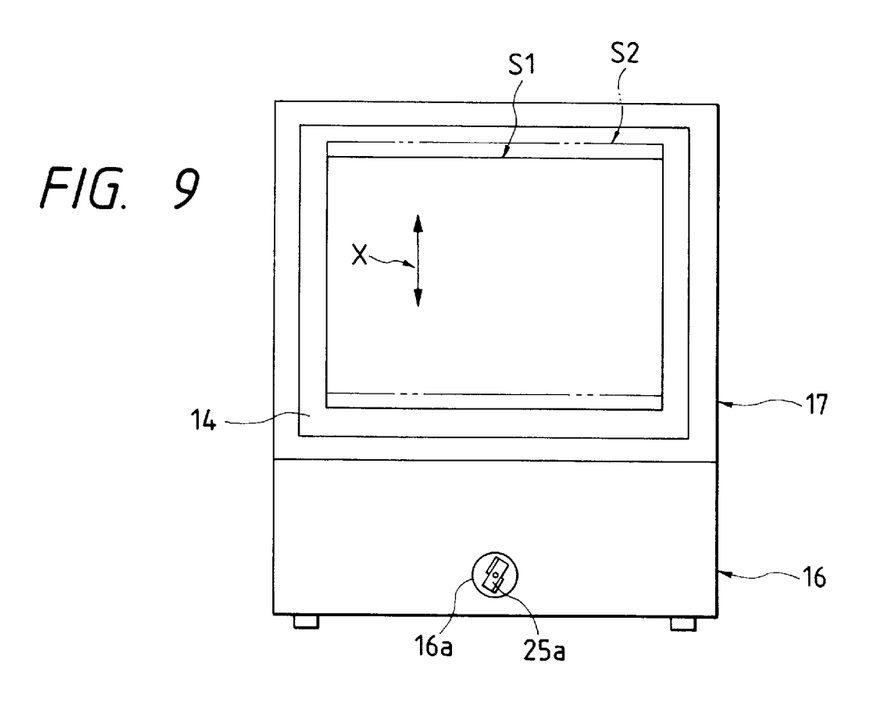
FIG. 9 is a front view showing the positional relationship of an image projected on a screen.

FIGS. 7 to 9 show the second embodiment of the present invention. For the sake of descriptive simplicity, the same reference numerals as in the first embodiment denote the same parts, and a description thereof will be omitted except for difference.

FIG. 7 is an exploded perspective view of a reflecting mirror unit having a swing and tilt adjusting mechanism in a rear projection monitor according to the second embodiment. FIG. 8 is a sectional view of the reflecting mirror unit. FIG. 9 is a front view of the rear projection monitor.

In the second embodiment, the swing and tilt adjusting mechanism for a first reflecting mirror 12 is made up of only the vis 22 and the adjusting nut 25a positioned at the lower portion of the front plate 23 in the first embodiment. The upper portion of the front plate 23 is pivotally supported by a shaft 31 extending through holes 21a formed in upright portions formed at the two side edges of a mirror support plate 21, and holes 23c formed in upright portions 23b formed on the L-shaped front plate 23. The shaft 31 is fixed by a slip-preventing E-ring 32 at the distal end of the shaft 31. The remaining arrangement is the same as that in the first embodiment.

In the second embodiment having this arrangement, to adjust the image positional shift, the adjusting nut 25a is pivoted to move and adjust an image projected on the screen 14 in the x direction in FIG. 9. That is, as shown in FIG. 8, the axial direction of the reflected beam changes from P2 to P2' by changing the incident angle of the beam incident on the first reflecting mirror 12, and the image position moves down from the position S2 to the correct position S1.

As described above, the first reflecting mirror 12 can be adjusted in only a planar direction perpendicular to a plane including an optical axis connecting the projection lens and the screen. As a result, the image projected on the screen 14 does not distort to a trapezoidal shape, and its position can be adjusted in the x direction.

What is claimed is:

1. A rear projection monitor comprising:

a projection optical system for projecting an original image;

a screen on which the original image is projected from a rear side to display an enlarged image of the original image; and a guide optical system for guiding light emitted from said projection optical system to said screen, said guide optical system having a movable reflecting surface held at three holding points, and functioning to adjust a position of the image on said screen in two dimensions by adjustment of said holding points to change an incident angle of light emitted from said projection optical system to the movable reflecting surface.

2. A monitor according to claim 1, wherein said guide optical system has a plurality of reflecting surfaces and the movable reflecting surface is a reflecting surface nearest to said projection optical system in said plurality of reflecting surfaces.

3. A monitor according to claim 1, wherein the movable reflecting surface is pivotal in an axial direction perpendicular to a plane including an optical path through which a beam on an optical axis of said projection optical system passes.

4. A monitor according to claim 3, wherein the movable reflecting surface is pivotal in a direction to vertically move the image on said screen.

5. A monitor according to claim 1, wherein a position of the image can be adjusted at a front side of said screen of said rear projection monitor using controls that adjust said holding points.

6. A monitor according to claim 1, wherein the movable reflecting surface is held by a holding member with a vis and a nut, wherein an interval between the movable reflecting surface and said holding member is changed by said nut in rotational cooperation with said vis, and the incident angle of light emitted from said projection optical system to the movable reflecting surface changes.

* * * * *

UNITED STATES PATENT AND TRADEMARK OFFICE
CERTIFICATE OF CORRECTION

PATENT NO. : 6,059,412

DATED : May 9, 2000

INVENTOR(S): YASUTOSHI SUGITA

It is certified that error appears in the above-identified patent and that said Letters Patent is hereby corrected as shown below:

COLUMN 2:

Line 20, "thereflecting" should read --the reflecting--.
Line 56, "vis" should read --vise--.

COLUMN 3:

Line 59, "vis" should read --vise--.

Signed and Sealed this

Tenth Day of April, 2001

Attest:

NICHOLAS P. GODICI

Attesting Officer

Acting Director of the United States Patent and Trademark Office